(12) United States Patent
Sadler et al.

(10) Patent No.: US 8,444,804 B2
(45) Date of Patent: May 21, 2013

(54) HEAT SEALING METHOD

(75) Inventors: James William Sadler, Toronto (CA);
Qin Lin, Kingston (CA); Gordon Charles Bird, Port Perry (CA); Victor Wayne McCarron, Whitby (CA)

(73) Assignee: Liqui-Box Corporation, Worthington, OH (US)

( * ) Notice: Subject to any disclaimer, the term of this patent is extended or adjusted under 35 U.S.C. 154(b) by 0 days.

(21) Appl. No.: 13/396,077

(22) Filed: Feb. 14, 2012

(65) Prior Publication Data

US 2012/0220439 A1 Aug. 30, 2012

Related U.S. Application Data

(62) Division of application No. 12/220,606, filed on Jul. 25, 2008, now Pat. No. 8,191,598.

(60) Provisional application No. 60/962,517, filed on Jul. 30, 2007.

(51) Int. Cl.
*B32B 37/00* (2006.01)
*B29C 65/00* (2006.01)

(52) U.S. Cl.
USPC ..... 156/308.4; 156/290; 156/292; 156/308.2; 53/451; 53/479

(58) Field of Classification Search
USPC .......... 156/145, 146, 290, 292, 308.2, 308.4, 156/209, 219, 268, 309.6; 53/451, 469, 477, 53/479, 373.7, 374.2, 375.3; 493/189, 203
See application file for complete search history.

(56) References Cited

U.S. PATENT DOCUMENTS

| 3,146,912 A | 9/1964 | Twersky |
| 3,982,992 A | 9/1976 | Moffitt |
| 4,609,107 A | 9/1986 | Martin et al. |
| 4,649,259 A | 3/1987 | Zurn |
| 5,038,550 A | 8/1991 | Wirsig et al. |
| 5,247,779 A | 9/1993 | Wirsig et al. |

(Continued)

FOREIGN PATENT DOCUMENTS

| EP | 0372886 | 6/1990 |
| EP | 0289209 A2 | 11/1998 |
| FR | 1216422 | 4/1960 |
| GB | 898641 | 6/1962 |

OTHER PUBLICATIONS

Machine translation of FR 1216422 date unknown.*

(Continued)

*Primary Examiner* — John Goff
(74) *Attorney, Agent, or Firm* — Potter Anderson Corroon LLP; Rakesh H. Mehta, Esq.

(57) ABSTRACT

This invention relates to a method for sealing film layers to form a sealed portion and a notch within the sealed portion, comprising: providing film layers between sealing jaws comprising a heat sealing element, with a sealing face having a length and a protrusion extending partly along the length of its sealing face; inducing a temperature gradient along the of sealing face length, wherein the temperature proximate to the protrusion is higher than at a distance from the protrusion; closing the jaws and simultaneously clamping the film at a location adjacent to the sealing face; holding the jaws closed for a period of time; and opening the jaws to release the layers of film.

7 Claims, 8 Drawing Sheets

U.S. PATENT DOCUMENTS

| | | | |
|---|---|---|---|
| 5,593,229 | A | 1/1997 | Warr |
| 5,826,985 | A | 10/1998 | Goodman et al. |
| 6,871,476 | B2 | 3/2005 | Tobolks |
| 7,003,934 | B1 | 2/2006 | Fano |
| 2006/0110081 | A1 | 5/2006 | Chapougnot et al. |

OTHER PUBLICATIONS

International Search Report and Written Opinion for PCT/CA2008/001365, dated Oct. 9, 2008.

U.S. Appl. No. 12/220,606, Restriction mailed Jun. 9, 2010.

U.S. Appl. No. 12/220,606, Non-Final Office Action mailed Sep. 10, 2010.

U.S. Appl. No. 12/220,606, Final Rejection mailed Feb. 16, 2011.

U.S. Appl. No. 12/220,606, Advisory Aciton mailed Jun. 24, 2011.

U.S. Appl. No. 12/220,606, Non Final Rejection maild Aug. 26, 2011.

U.S. Appl. No. 12/220,606, Notice of Allowance mailed Jan. 24, 2012.

* cited by examiner

HEAT SEALING METHOD

CROSS-REFERENCE TO RELATED APPLICATION

This application is filed under the provisions of 35 U.S.C. §121 and claims priority to U.S. patent application Ser. No. 12/220,606, filed on Jul. 25, 2008, now U.S. Pat. No. 8,191,598 which in turn claims priority to the U.S. Provisional Patent Application No. 60/962,517, filed on Jul. 30, 2007. Both applications are incorporated herein in their entirety.

FIELD OF THE INVENTION

This invention relates generally to the production of packaging pouches and more specifically to a heat sealing jaw that is suitable for producing an easy-open feature on a packaging pouch.

BACKGROUND

Packaging pouches are typically made on form, fill and seal machines. For example, using a vertical form, fill and seal machine, a flat web of synthetic thermoplastic film is unwound from a roll and formed into a continuous tube in a tube forming operation, by sealing the longitudinal edges of the film together to form a lap seal or a fin seal. The tube thus formed is pulled vertically downwards to a filling station. The tube is then collapsed across a transverse cross-section of the tube, the position of the cross-section being at a sealing device below the filling station. A transverse heat seal is made by the sealing device at the collapsed portion of the tube, thus making an airtight seal across the tube. The sealing device generally comprises a pair of jaws.

After making the transverse seal, but before the jaws of the sealing device are opened, a quantity of material to be packaged, for example a liquid, is caused to enter the tube at the filling station, and to fill the tube upwardly from the aforementioned transverse seal. The tube is then caused to move downwardly a predetermined distance. This movement may be under the influence of the weight of the material in the tube, or it may be caused by pulling or mechanically driving the tube The jaws of the sealing device are closed again, thus collapsing the tube at a second transverse section. The second transverse section may be above, usually just above the air/material interface in the tube, or the second transverse section may be below the air/material interface. The sealing device seals and severs the tube transversely at the second transverse section. The material filled portion of the tube is now in the form of a pillow shaped pouch. Thus the sealing device has sealed the top of the filled pouch and sealed the bottom of the next pouch to be formed, all in one operation. The filling of the product may be conducted on a continuous or intermittent basis. One such vertical form, fill and seal machine of the type described above is sold under the trade-mark PREPAC. Other suitable machines are sold under the trade-marks INPACO and ELECSTER.

A variety of flowable materials may be packaged in this manner, for example, milk, syrups, sauces, juices, water and the like. The term "flowable material" can include materials that are flowable under gravity or may be pumped. Such materials may include emulsions, pastes, peanut butter, preserves, dough, ground meat, powders, detergents, oils and granular solids. Such pouches can also be used to contain other flowable materials such as foods that are packaged under sterile, pasteurized or aseptic conditions. The packaging conditions will normally require modifications to the machine and also modifications to the methods of packaging.

The pouches produced through this type of process can be manufactured to contain any volume of flowable material. In the situation where drinking fluids are packaged in this fashion, a typical size might be 250 mls or 500 mls. In such instance, it is possible to consume the fluid directly from the pouch. Thus, providing a pouch that includes an easy-open feature for this purpose is desirable especially when served in correctional facilities since it avoids the necessity to use an implement such as a knife or scissors. In addition, since these packages are meant for one-time use and are disposable, it is appropriate that the manner in which they are manufactured is as economical as possible, without sacrificing the basic packaging requirements for the materials in question.

Many solutions have been proposed for producing packages of this type, and typically such packages have included a notch or tear line which allows the package to be opened. For example, French Patent No. 1 216 422 discloses liquid-filled polymer pouches that are produced by collapsing a tube and having an easy-open feature. The easy-open feature comprises a sealed area partially extending across the width of the pouch and a weakened line extending within the sealed area. The weakened line is formed using a set of jaws where one jaw comprises a piano wire.

United Kingdom Patent No. 898,641 discloses a pouch having a line of weakness for easy opening that is produced by pressing the sheet between a solid plate and a ribbed die while heat is applied. The sheet is pinched between the plate and the rib of the die and reduced in thickness but not sheared, or otherwise punctured along the desired line.

U.S. Pat. No. 5,038,550 and European Patent No. 0 372 886 both disclose pouches having a slit formed within a sealed portion. The slit is intended as a device for starting a tear and for directing the tear in a preferred direction. In both cases the sealed portion is formed first using a sealing element and then the slit is formed using a separate cutting operation using a knife.

U.S. Patent Application Publication No. US 2006/0110081 A1 published on May 25, 2006, discloses a pouch for containing a flowable material, provided with an easy-open feature located adjacent to an upper closure or a lower closure of the pouch. The easy-open feature comprises a seal formed between two layers of film and provides a tear line for opening the pouch and tearing a corner off the pouch.

One concern with easy-open features in packaging pouches is that during the production, filling, handling or any manipulation of the pouches, stresses are induced in the film that forms the walls of the pouch. Therefore, depending on the configuration of the easy-open feature, it may produce a stress concentration in the film and hence make the film more susceptible to tearing in specific areas.

Thus there is a need for an improved heat sealing jaw that can be used to easily and economically produce an easy-open feature in a pouch that is sufficiently robust to withstand stresses induced on the pouch during manipulation and/or filling of the pouch.

SUMMARY OF THE INVENTION

Accordingly, the present invention provides a heat sealing jaw which can be used to produce a packaging pouch with an easy-open feature, wherein the easy-open feature does not significantly compromise the integrity of the packaging pouch.

According to one aspect, the present invention provides a heat sealing jaw for use in cooperation with an opposing backing jaw for sealing layers of film together to form a sealed portion and a notch within the sealed portion. The heat sealing jaw comprises a jaw body, a heat sealing element secured to the jaw body, a support surface associated with the heat sealing element for clamping the layers of film against the opposing backing jaw and a heat sink coupled to the heat sealing element. The heat sealing element has a sealing face for pressing the layers of film together against the opposing backing jaw and forming the sealed portion. The sealing face has a protrusion for forming the notch within the sealed portion. The heat sink is coupled to the heat sealing element at a location adjacent to the support surface, and during operation, the heat sink induces a temperature gradient along the sealing face of the heat sealing element.

Advantageously, the heat sealing element may further comprise a clamping portion that is disposed at an orientation diverging from a plane along which the layers of film are sealed together. This tends to facilitate the securing of the heat sealing element to the jaw body which may also serve as the heat sink.

According to another aspect, the present invention also provides a heat sealing jaw for use in cooperation with an opposing backing jaw for forming an easy open feature adjacent to an edge of a packaging pouch made from layers of film sealed together. The heat sealing jaw comprises a jaw body, a heat sealing element secured to the jaw body, a support surface associated with the heat sealing element and a heat sink coupled to the heat sealing element. The heat sealing element has a sealing face for forming a sealed portion extending inwardly from the edge of the pouch. Accordingly, the sealing face has an outboard end to be positioned outside of the edge of the pouch, an inboard end to be positioned inside the edge of the pouch and a protrusion for forming the notch within the sealed portion. The support surface is associated with the inboard end of the sealing face for clamping the layers of film against the opposing backing jaw. The heat sink is coupled to the heat sealing element at a location adjacent to the inboard end of the sealing face, and during operation, the heat sink induces a temperature gradient along the sealing face of the heat sealing element.

According to another aspect, the present invention provides a heat sealing element for use in a heat sealing jaw in cooperation with an opposing backing jaw for sealing layers of film together to form a sealed portion and a notch within the sealed portion. The heat sealing element comprises a sealing face for pressing the layers of film together against the opposing backing jaw and forming the sealed portion, and, a clamping portion adjacent to the sealing face. The sealing face has a protrusion for forming the notch within the sealed portion. The clamping portion is disposed at an orientation diverging from a plane along which the layers of film are sealed together.

According to a further aspect, the present invention provides a method of sealing layers of film together to form a sealed portion and a notch within the sealed portion comprising the steps of:
 a) providing layers of film to be sealed together between a heat sealing jaw and a cooperating backing jaw, the heat sealing jaw comprising a heat sealing element with a sealing face having a length and a protrusion extending partly along the length of the sealing face;
 b) inducing a temperature gradient along the length of the sealing face of the heat sealing element, wherein a first temperature of the sealing face adjacent to the protrusion is higher than a second temperature of the sealing face at a distance from the protrusion;
 c) closing the jaws to press the layers of film between the sealing face of the heat sealing element and the backing jaw, and, to simultaneously clamp the film at a location adjacent to the sealing face;
 d) holding the jaws closed for a period of time required to form the sealed portion and the notch; and
 e) opening the jaws to release the layers of film.

The above method may be performed on a pouch forming and filling machine such as a vertical form, fill and seal packaging machine, in conjunction with additional steps that are required to form a packaging pouch having an easy-open feature and filled with flowable material. Accordingly, the layers of film may be provided between the heat sealing jaw and the cooperating backing jaw in the form of a film tube that is partially filled with flowable material. The temperature gradient along the length of the sealing face may be induced by extracting heat from the heat sealing element using, for example, a heat sink coupled to the heat sealing element.

BRIEF DESCRIPTION OF THE DRAWINGS

Further details of these and other aspects of the present invention will be apparent from the detailed description and figures included below, which are exemplary and included for illustrative purposes. Those skilled in the relevant art(s) will understand that the following description and drawings and are not intended to limit the scope of the teachings herein in any way.

Reference is now made to the accompanying figures, in which like references are intended to refer to like or corresponding parts.

DETAILED DESCRIPTION OF THE PREFERRED EMBODIMENTS

Figure 1:
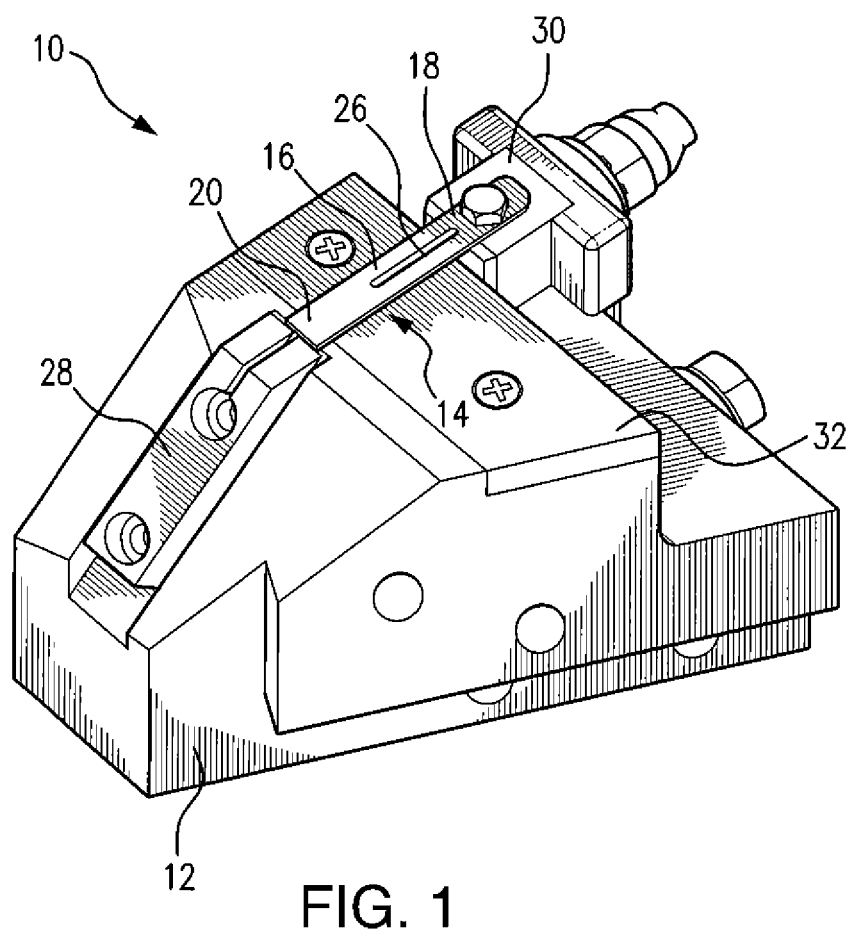
FIG. 1 is an isometric view of a heat sealing jaw according to an embodiment of the present invention.
Figure 2:
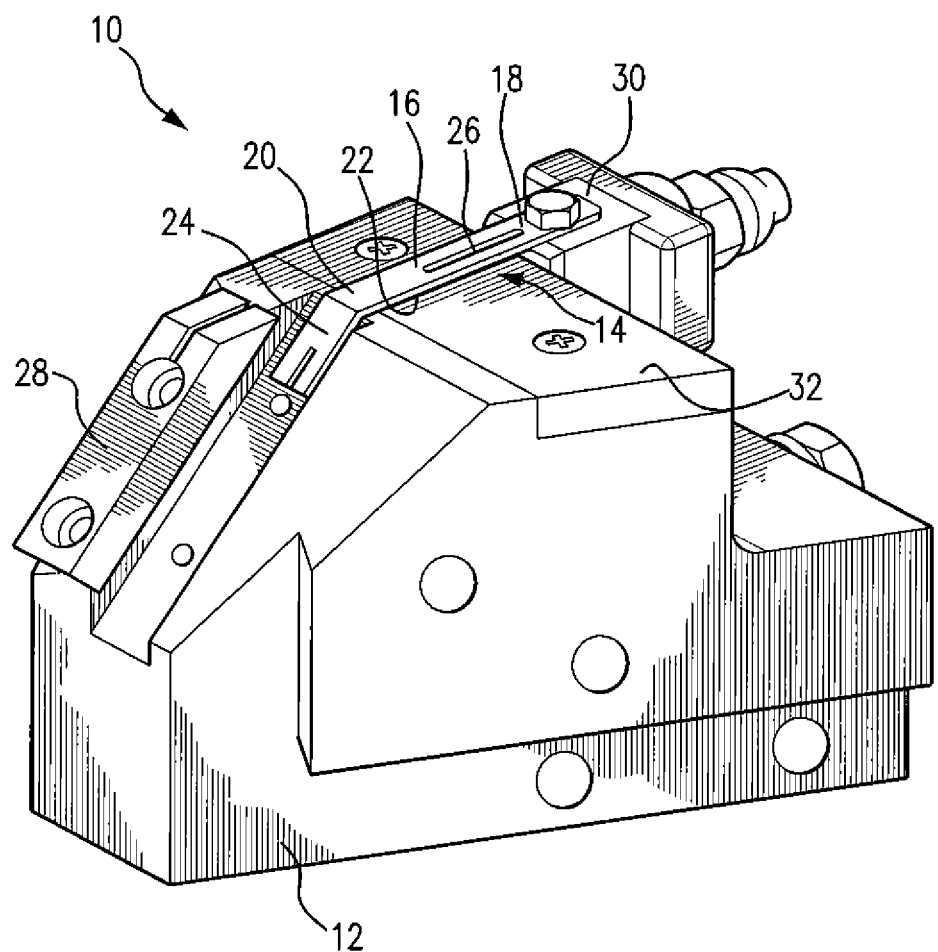
FIG. 2 is an isometric view of the heat sealing jaw of FIG. 1 with a clamp removed.
Figure 3:
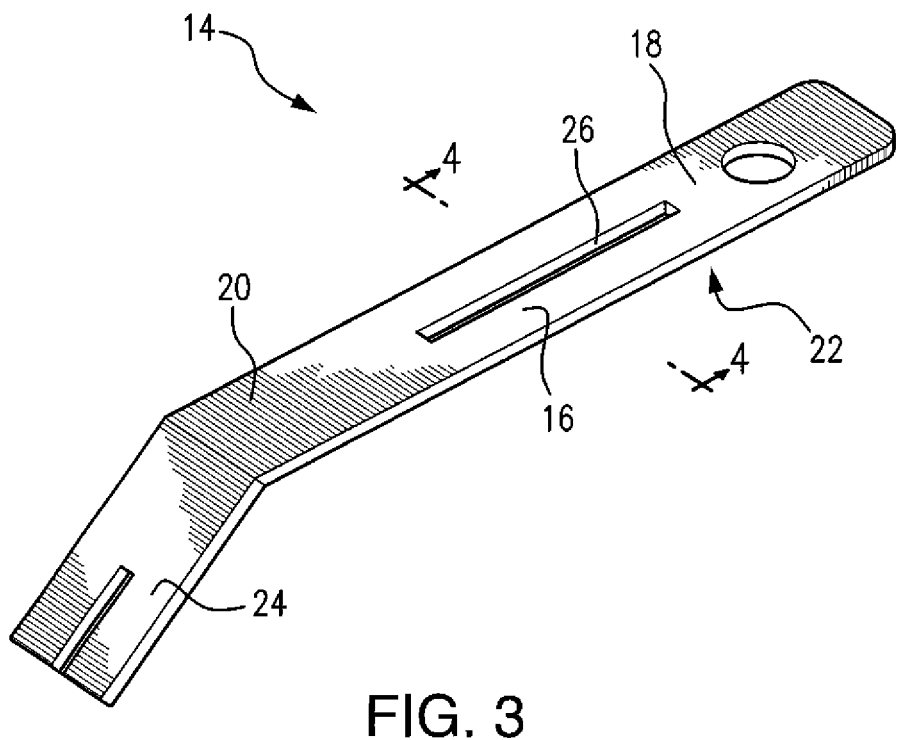
FIG. 3 is an isometric view of a heat sealing element from the heat sealing jaw of FIG. 1.

Referring now to FIG. 1, a heat sealing jaw, generally shown at 10, for use in cooperation with an opposing backing jaw (not shown) for sealing layers of film together is shown. The heat sealing jaw 10 can be used on a vertical form, fill and seal (VFFS) packaging machine for producing an easy-open feature on a pouch containing flowable material.

Many types of films can be used to manufacture pouches in accordance with the present invention. Generally these films must be capable of self-sealing and processing through the VFFS equipment. They should be stiff enough and strong enough for the proposed packaging applications. The nature of the packaging application determines the film selection and the person skilled in the art would be capable of readily selecting a suitable film for the desired purpose. Examples of suitable films include any synthetic thermoplastic polymeric film which meets the above-mentioned criteria. The films may contain a barrier layer selected from nylon polymers, polyethylene terephthalate polymers, amorphous nylon or ethylene vinyl alcohol. An additional tie layer may be present and can be selected from ethylene vinyl acetate polymer, ethylene acid copolymers, ionomers or anhydride functionalized ethylene copolymers. All of these may be combined with at least one high pressure ethylene homopolymer. Other examples of suitable films are described in the following references: WO 98/34844, WO 98/29249, WO 97120693, WO 97/12755, WO 95/21743, WO 95/10566, WO 95/00587, the disclosures of which are incorporated herein by reference. These are merely representative examples of thermoplastic films and the invention is not to be limited in any way with respect to the film selected for manufacture of the pouch.

As shown in FIGS. 1-4, the heat sealing jaw 10 comprises a jaw body 12 and a heat sealing element generally shown at 14 secured to the jaw body 12. The heat sealing element 14 comprises a sealing face 16 having a first end 18 and a second end 20, and, a back face 22. The heat sealing element 14 also has a clamping portion 24 that is disposed at an orientation diverging from the sealing face 16, which is also diverging from a plane along which the layers of film are sealed together during operation. The sealing face 16 has a rib-shaped protrusion 26 which is located at a distance from the second end 20.

The heat sealing element 14 is secured to the jaw body 12 by clamping the clamping portion 24 of the heat sealing element 14 to the jaw body 12 using a clamp 28. The clamping portion 24 of the heat sealing element 14 is thermally and electrically connected to the jaw body 12 so that the jaw body 12 can also serve as an electrical terminal of the heat sealing element 14. The heat sealing element 14 is also electrically connected to terminal 30 which is electrically isolated from the jaw body 12.

A thermal insulator 32 is also disposed on at least a portion of the back face 22 of the heat sealing element 14 so as to thermally insulate the heat sealing element 14 from the jaw body 12 in a region adjacent to the sealing face 16.

Figure 5:
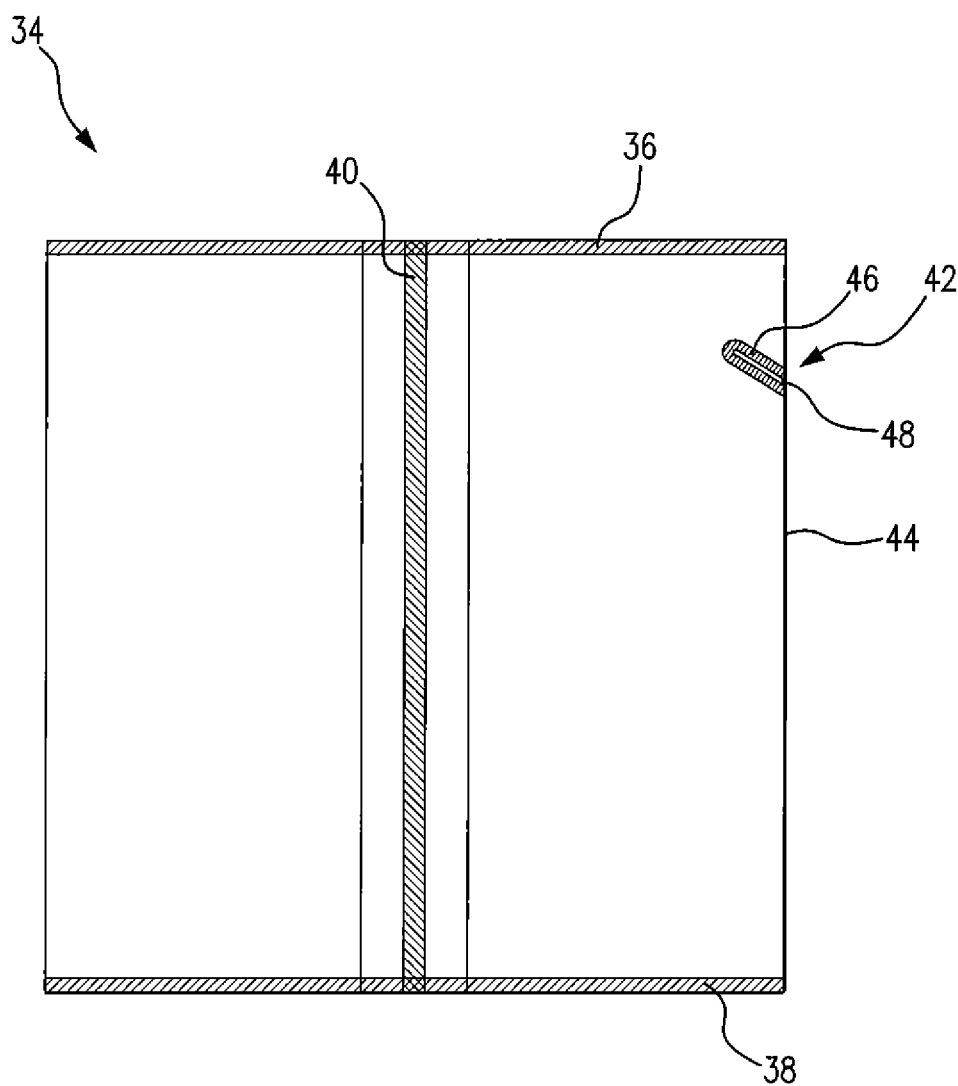
FIG. 5 is a front elevation view of a packaging pouch having an easy-open feature formed using the heat sealing jaw of FIG. 1.

Referring now to FIG. 5, an exemplary packaging pouch generally shown at 34 and made in accordance with the present invention is shown. The pouch 34 is made by sealing layers of film together and comprises an upper transverse seal 36, a lower transverse seal 38 and a longitudinal fin seal 40. The pouch 34 also has an easy-open feature 42, disposed along or adjacent to a side edge 44 of the pouch 30. The easy-open feature 42 can be made using the heat sealing jaw 10 and comprises a sealed portion 46 and a notch 48 within the sealed portion 46.

Figure 6:
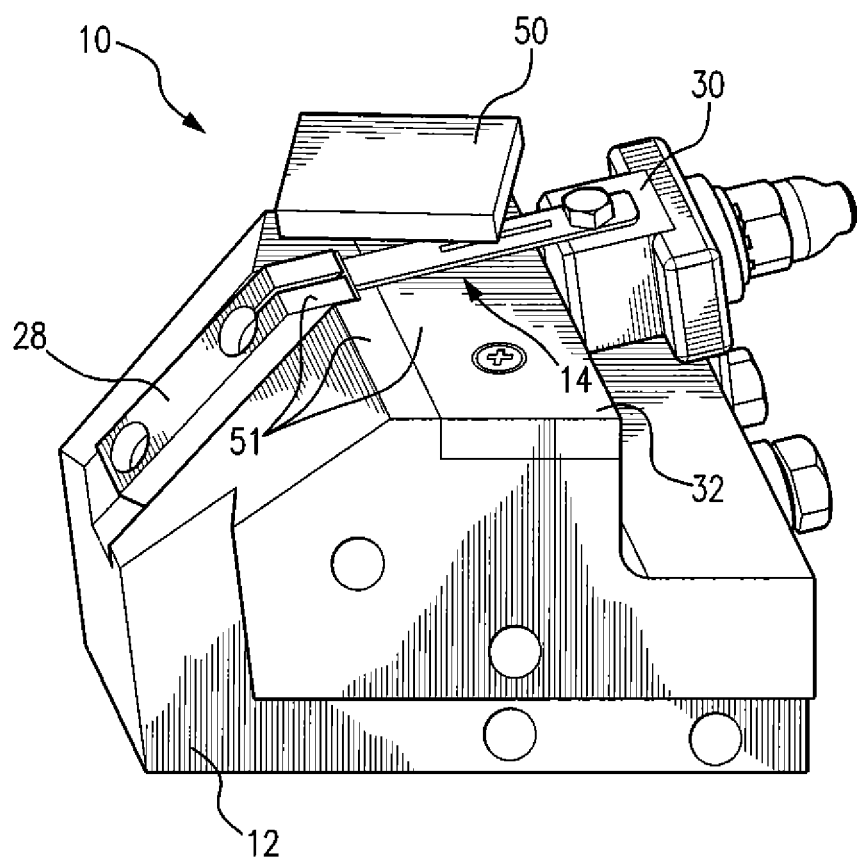
FIG. 6 is an isometric view of the heat sealing jaw of FIG. 1 positioned in relation to an opposing resilient backing member.

In order to seal the layers of film together and produce the easy-open feature 42 on the pouch 34, the heat sealing jaw 10 works in cooperation with an opposing conventional backing jaw which is not shown. However, a resilient backing member 50 which is part of the opposing backing jaw is shown in FIG. 6. The structure and configuration of such backing jaws are known to one skilled in the art. The heat sealing element 14 is heated by resistance heating and the layers of film are pressed together between the heat sealing jaw 10 and the resilient backing member 50.

The protrusion 26 on the sealing face 16 forms the notch 48 within the sealed portion 46 of the easy-open feature 42. The geometry of the protrusion 26 may be selected based on the notch geometry desired. The notch 48 may comprise an indentation, a cut or any type of material weakness formed within the sealed portion 46 that can be used to initiate tearing of the layers of film and thereby facilitate the opening of the pouch 34. For example, the protrusion 26 may be selected to produce a notch which extends completely through the layers of film that are sealed together or to produce a notch which only partially extends through the layers of film so as to form a weakened region of reduced thickness. Other shapes and configurations of protrusions to produce any variety of notches may also be used. In different embodiments, the weakened region may be made prior to or at the same time as the perimeter seal.

As shown in FIG. 6, the resilient backing member 50 may extend beyond the area of the sealing face 16 of the heat sealing element 14 so that during the sealing process, the film layers are simultaneously clamped between the resilient backing member 50 and a support surface 51 associated with the heat sealing element 14. The support surface 51 may be provided by at least a portion of at least one of the thermal insulator 32, the jaw body 12, and the clamp 28. Depending on the process conditions, a portion of the sealing face 16 adjacent to the second end 20 may also provide some support for clamping the film layers. The support surface 51 serves to stabilize the film around the area where the sealed portion 46 is being formed. Providing adequate support or film clamping adjacent to or at the second end 20 of the sealing face 16 during the sealing process can be beneficial in producing a good quality seal.

The difference in elevation between the heat sealing element 14 and the support surface 51 produces a pressure profile across the resilient backing member 50 during the sealing cycle and causes any flowable material in the pouch 34 to clear the location of the easy-open feature 42. This ensures that the flowable material inside the pouch 34 does not contaminate the sealed portion 46 of the easy-open feature 42.

Figure 7:
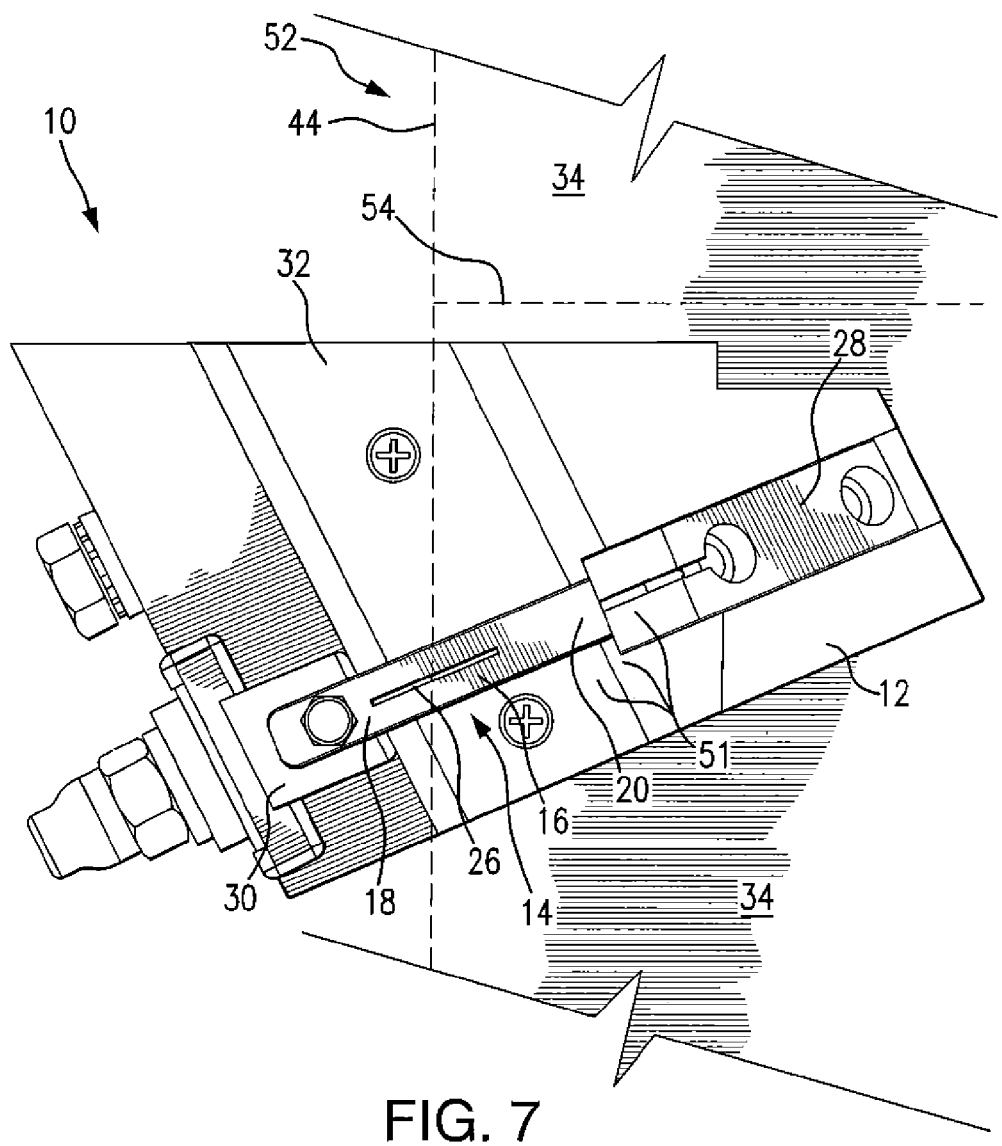
FIG. 7 is a front elevation view of the heat sealing jaw of FIG. 1 positioned in relation to a film tube used for producing the pouch of FIG. 5.

FIG. 7 shows the position of the heat sealing jaw 10 in relation to a film tube generally shown at 52, during the process of producing pouches 34 filled with flowable material on a VFFS packaging machine. The pouches 34 are typically sealed and separated along a cut line 54 using another separate transverse heat sealing and cuffing element (not shown) in order to form the transverse seals 36 and 38 on the pouch 34. The separate transverse heat sealing and cutting element, may be secured to a separate jaw or to the same jaw as the heat sealing element 14. Therefore, the easy-open feature 42 may be formed at the same time or at a different time as when the pouches 34 are sealed and separated along the cut line 54.

Also seen in FIG. 7, in an embodiment second end 20 of heat sealing element 14 is seen to be within the film path of film tube 52 moving through the apparatus to form pouch 34, while first end 18 of heat sealing element 14 is outside the film path. In this arrangement, the inboard terminal associated with heat sealing element 14 is within the film path, and thus extends a distance towards the interior of pouch 34, while the outboard terminal associated with heat sealing element 14 is outside the film path.

Figure 8:
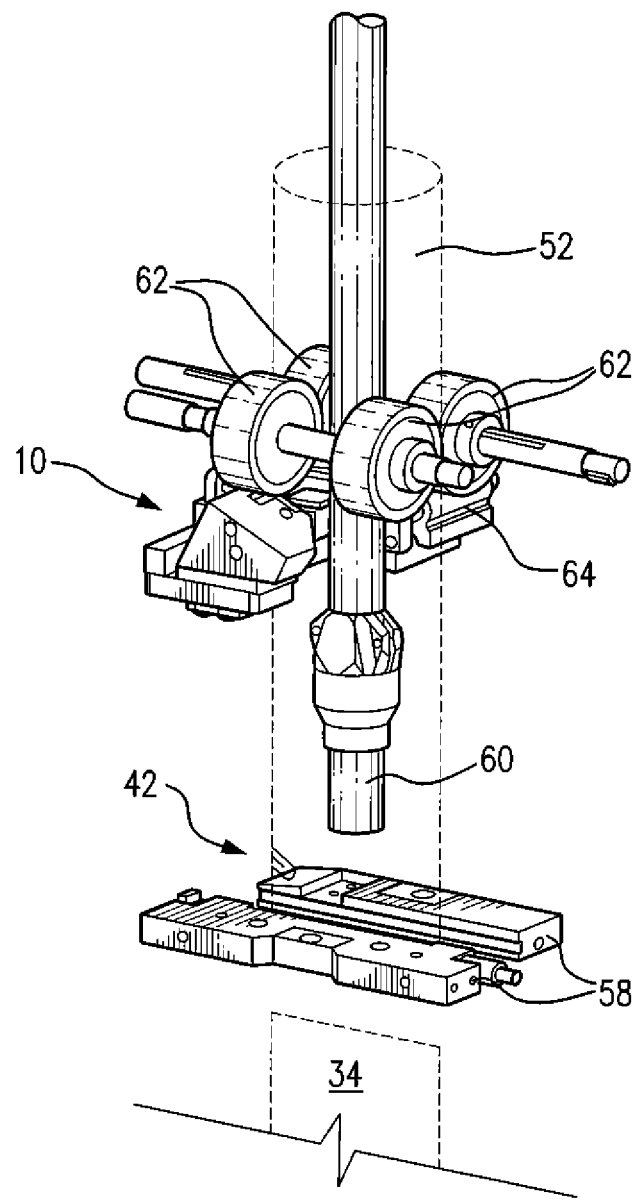
FIG. 8 is an isometric view of the heat sealing jaw of FIG. 1 positioned within the filling compartment of a vertical form, fill and seal packaging machine.

FIG. 8 shows the heat sealing jaw 10 installed within the filling compartment of an exemplary VFFS packaging machine. The filling compartment comprises transverse sealing jaws 58, longitudinal sealing jaws (not shown), a fill tube 60 and driven feed rollers 62. During the process of forming and filling pouches 34 in the VFFS machine, the transverse sealing jaws 58 form a first transverse seal (36 and 38) across the film tube 52 then the vertically extending film tube 52 is intermittently fed downwardly by the driven feed rollers 62 by a distance corresponding to a height of the pouch 34 while being simultaneously filled with flowable material via the fill tube 60. When the film tube 52 stops, the heat sealing jaw 10 in cooperation with the opposing backing jaw, forms the easy-open feature 42 and the transverse sealing jaws 58 form the transverse seal 36 and 38 across the film tube 52. The transverse sealing jaw may also simultaneously cut the film tube 52 in order to separate the pouches 34 or weaken the film tube 52 in order to form a string of separable pouches 34. Alternatively, the film tube 52 may be cut via a separate operation using conventional means such as a knife or the like. The longitudinal sealing jaws form the fin seal 40 of the pouch 34. In the present embodiment, the heat sealing jaw 10 is located above or upstream of the transverse sealing jaws 58 and actuated by a separate actuator 64. Alternatively, the heat sealing jaw 10 could be disposed below the transverse sealing jaws 58 and/or be associated with the same actuator as the transverse sealing jaws 58.

FIG. 7 further shows that the first end 18 of the sealing face 16 is positioned on the outside of the side edge 44 or outboard of the film tube 52 and that the second end 20 of the sealing face 16 is positioned on the inside of the side edge 44 or inboard of the film tube 52. Accordingly, the sealing face 16 of the heat sealing element 14 extends across the side edge 44 of the film tube 52 so as to produce the sealed portion 46 and the notch 48 which extend inwardly from the side edge 44 of the film tube 52.

The heat sealing jaw 10 may also be positioned so as to orient the notch 48 in the sealed portion 46 at an oblique angle from the side edge 44 as shown in FIG. 7. This provides the advantage that the easy-open feature 42 can be used to facilitate the opening of the pouch 34 by tearing off a corner of the pouch 34. Advantageously, this may also reduce the stress concentration factor created by the easy-open feature 42 in the pouch 34. During filling and handling of the pouches 34, tensile stresses are induced in the walls of the pouch 34 and the oblique orientation of the notch 48 of the easy-open feature 42 may reduce the tendency of the easy-open feature 42 to initiate failure of the pouch 34 during filling and handling.

The clamping portion 24 of the heat sealing element 14 is thermally coupled to the jaw body 12 via the clamp 28. Hence, the jaw body 12 and potentially also the clamp 28 can serve as a heat sink to draw heat away from the heat sealing element 14. This results in a temperature gradient being induced along the sealing face 16 wherein the temperature of second end 20 of the sealing face 16 is lower than the temperature of the first end 18 of the sealing face 16. The higher temperature near the first end 18 of the sealing face 16 allows the protrusion 26 to form a notch which may extend completely through the film layers while the lower temperature of the second end 20 of the sealing face 16 is such that a seal is not formed between the film layers and therefore allows the seal to be terminated at this location. Such a temperature gradient is beneficial in forming a suitable transition between the sealed portion 46 and an unsealed portion of the pouch 34, which does not significantly compromise the integrity of the pouch 34. Depending on the process conditions, any portion of the sealing face 16 where the temperature is such that no seal is formed between the film layers, may effectively serve to clamp and stabilize the film layers against the backing jaw in addition and similar to the support surface 51.

A suitable temperature gradient along the sealing face 16 of the heat sealing element 14 may be achieved in a number of different ways. For example, depending on the process conditions (i.e. film material, configuration of easy-open feature, cycle time), it may be necessary to use a jaw body 12 that is actively cooled using liquid cooling or the like. It may also be necessary to thermally isolate at least a portion of the heat sealing element 14 from the jaw body 12 using the thermal insulator 32. A suitable material for the thermal insulator 32 could be for example a reinforced fibre glass material. Other choices would be apparent to those skilled in the art. The clamp 28 may also be thermally coupled to the clamping portion 24 and contribute to the heat sink. Proper design and material selection and configuration of the jaw body 12, clamp 28 and thermal insulator 32 for producing a suitable temperature gradient along the sealing face 16 of the heat sealing element 14 will depend on the process conditions and will be apparent to one skilled in the art. Accordingly, it is also apparent that the components which contribute to the heat sink do not necessarily have to be electrically coupled to the heat sealing element 14.

Figure 4:
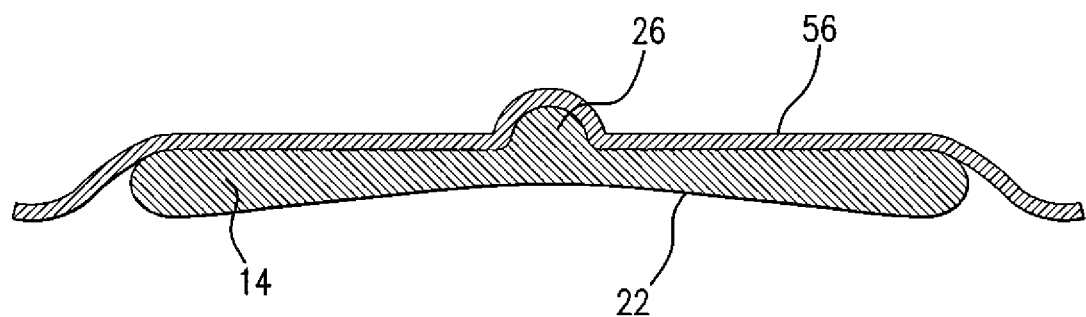
FIG. 4 is a cross-sectional view of the heat sealing element of FIG. 3 along line 4-4 in FIG. 3.

Depending on the process conditions, it may also be desirable to use a release medium 56 between the heat sealing element 14 and the layers of film so as to prevent the film from adhering to the heat sealing element 14 when releasing the film following the sealing operation. The release medium 56 disposed on the sealing face 16 of the heat sealing element 14 is illustrated in FIG. 4. Teflon® tape or film is suitable for this purpose. Similarly, a release medium may also be disposed on the resilient backing member 50.

Depending on the process conditions, it may also be desirable to use an electrical insulating medium between the back face 22 of the heat sealing element 14 so as to electrically insulate the heat sealing element 14 from the jaw body 12. In one embodiment, the thermal insulator 32 may also be an electrical insulator. In another embodiment, the electrical insulating medium can be Teflon® tape or a film suitable to provide electrical insulation. The tape or film may also extend beyond the end of the thermal insulator 32 to provide electrical insulation as far as the clamping portion 24. In some embodiments, the electrical insulating medium may further provide additional thermal insulation.

The above description is meant to be exemplary only, and one skilled in the art will recognize that changes may be made to the embodiments described without department from the scope of the invention disclosed. It is apparent that the heat sealing jaw 10 described above can be fabricated using conventional manufacturing procedures using suitable materials that would be apparent to a person skilled in the relevant art. It is also apparent that other heat sink configurations may also be used for producing a suitable temperature gradient along the sealing face 16 of the heat sealing element 14. One skilled in the art would also recognize that an easy-open feature located at a distance from a free edge of the pouch may also be produced using a heat sealing element 14 wherein both the first section end 16 and the second section end 18 are coupled to a heat sink and the sealing face does not extend across an edge of the pouch. It is further apparent that the heat sealing jaw 10 is not limited to vertical form, fill and seal machines but could also be used on other types of packaging machines. Still other modifications which fall within the scope of the present invention will be apparent to those skilled in the art, in light of a review of this disclosure, and such modifications are intended to fall within the appended claims.

What is claimed is:

1. A method of sealing layers of film together to form a sealed portion and a notch within said sealed portion, said method comprising the steps of:
   (a) providing layers of film to be sealed together between a heat-sealing jaw and a cooperating backing jaw, said heat-sealing jaw comprising
      i) a jaw body;
      ii) a heat-sealing element secured to said jaw body, said heat-sealing element comprising a first end and a second end, said heat-sealing element having a clamping portion and a sealing face for pressing said layers of film together against said opposing backing jaw, wherein said clamping portion is proximate to said second end of said heat-sealing element, wherein said clamping portion is disposed at an orientation diverging from said sealing face, and wherein said sealing face has a length and a protrusion extending partly along said length of said sealing face for forming said notch within said sealed portion;

iii) a support surface comprising at least a portion of at least one of the heat-sealing element, an additional separate element, and the jaw body associated with the heat-sealing element for clamping the layers of film against the opposing backing jaw; and iv) a heat-sink comprising at least one of an additional separate element and the jaw body coupled to the heat-sealing element at a location adjacent to the support surface, which, during operation, induces a temperature gradient along the sealing face of the heat-sealing element in the longitudinal direction of the sealing face;

(b) inducing a temperature gradient along said length of said sealing face of said heat-sealing element, wherein a first temperature of said sealing face adjacent to said protrusion is higher than a second temperature of said sealing face at a distance from said protrusion;

(c) closing said jaws to press said layers of film between said sealing face of said heat-sealing element and said backing jaw, and, to simultaneously clamp said film at a location adjacent to said sealing face;

(d) holding said jaws closed for a period of time required to form said sealed portion and said notch; and (e) opening said jaws to release said layers of film.

2. The method as defined in claim 1, wherein said layers of film are provided in the form of a film tube that is partially filled with flowable material.

3. The method as defined in claim 2, further comprising the step of forming a separate transverse seal across said film tube and simultaneously cutting said film tube through said separate transverse seal.

4. The method as defined in claim 3, further comprising the steps of:
(i) forming a separate transverse seal across said film tube, and
(ii) cutting said film tube through said separate transverse seal.

5. The method as defined in claim 4, further comprising the step of;
(iii) advancing said film tube by a predetermined distance corresponding to a size of a packaging pouch, relative to said heat-sealing jaw; said advancing step being performed after said opening step (e).

6. The method as defined in claim 1, wherein said first temperature of said sealing face permits said protrusion to cut through said layers of film during said holding step (d).

7. The method as defined in claim 1, wherein said second temperature of said sealing face is lower than a temperature required to seal said layers of film together.

* * * * *